(12) United States Patent
Drouglazet et al.

(10) Patent No.: US 6,454,853 B1
(45) Date of Patent: Sep. 24, 2002

(54) PROCESS FOR THE PURIFICATION OF ORGANIC PRODUCTS BY FRACTIONATED CRYSTALLIZATION AT A VARIABLE CIRCULATION RATE

(75) Inventors: Guenaël Drouglazet, Kingersheim; René Genin, Mulhouse; Edouard Schwartzman, Paris, all of (FR)

(73) Assignee: Befs Prokem S.A. (FR)

( * ) Notice: Subject to any disclaimer, the term of this patent is extended or adjusted under 35 U.S.C. 154(b) by 0 days.

(21) Appl. No.: 09/686,374

(22) Filed: Nov. 6, 2000

(30) Foreign Application Priority Data

Oct. 12, 1999 (FR) .............................................. 99 12716

(51) Int. Cl.[7] ................................................. C30B 7/08
(52) U.S. Cl. ........................ 117/68; 117/70; 422/245.1; 422/252; 422/253; 23/295 R
(58) Field of Search ..................... 23/293 R; 422/245.1, 422/252, 253; 117/68, 70

(56) References Cited

U.S. PATENT DOCUMENTS

| | | | |
|---|---|---|---|
| 4,493,719 A | | 1/1985 | Wintermantel et al. |
| 4,512,959 A | * | 4/1985 | Pohland et al. ............. 423/121 |
| 5,030,713 A | * | 7/1991 | Wild et al. .................. 528/482 |
| 5,817,865 A | * | 10/1998 | Machhammer et al. ..... 560/208 |
| 5,831,124 A | * | 11/1998 | Machhammer et al. ..... 562/500 |
| 6,145,340 A | * | 11/2000 | Stepanski et al. ............. 62/532 |
| 6,310,218 B1 | * | 10/2001 | O'Brien et al. ............. 549/231 |

FOREIGN PATENT DOCUMENTS

EP  0 616 998 A1  9/1994

* cited by examiner

*Primary Examiner*—Robert Kunemund
(74) *Attorney, Agent, or Firm*—Schnader Harrison Segal & Lewis LLP

(57) ABSTRACT

The present invention pertains to a process for the purification of an organic product by fractionated crystallization, characterized in that the organic product is purified by circulation in filled tubes by varying the circulation rate at each purification and concentration stage. The invention also pertains to an apparatus for the purification of an organic product by fractionated crystallization designed for the implementation of said process.

14 Claims, 5 Drawing Sheets

PROCESS FOR THE PURIFICATION OF ORGANIC PRODUCTS BY FRACTIONATED CRYSTALLIZATION AT A VARIABLE CIRCULATION RATE

FIELD OF THE INVENTION

The present invention concerns a process for the purification of an organic product by fractionated crystallization at a variable circulation rate. The invention also pertains to an apparatus for the implementation of this process.

Known in the prior art are three types of processes for the purification of organic products by crystallization:

Continuous crystallization in which the crystals are formed in a crystallizer and maintained in suspension. The slurry of crystals is then sent to a separation system that is generally constituted of a centrifuge or washing column.

Static crystallization which is a discontinuous process employing an apparatus equipped with a heat transfer device. This apparatus is first filled with the crude product which is completely liquid at that point. The apparatus is then cooled in order to generate crystals (crystallization step). These crystals stick to the walls. When a sufficient quantity of crystals has been formed, the liquid charged with impurities is drained off gravitationally (drainage step). In order to increase the purity of the product remaining in the apparatus, a partial melting of the crystals can be implemented (purification of the residual liquid). This is the liquid phase separation step. The crystals are then melted so as to obtain the purified product in liquid form (melting step). All of these steps together constitute a stage. One generally speaks of a purification stage when the previously mentioned steps are intended to purify the product and of a concentration stage when the steps are intended to concentrate the impurities (improvement of the yield). Attached FIG. 1 shows the recyclings that are implemented when multiple stages are required. In the case of the static process, the crystals can grow in the entire volume of the crystallizer. At the end of the crystallization step, they constitute a network of relatively constant porosity. During the drainage step, the liquid flows through this network. It is therefore recommended that the height of the apparatus be limited so that the drainage step can be implemented within an acceptable period of time.

Dynamic crystallization which is also a discontinuous process; the phases of the process are identical to those of static crystallization. The principal difference is that the product circulates in the apparatus during the crystallization phase. In the case of the dynamic process, the product which crystallizes circulates inside tubes. Because of the movement of the product, the crystallization takes place in layers. At the end of the crystallization step, each tube therefore contains a layer of crystals sticking to the walls, and a central well containing the waste liquid. The drainage step consists of draining these central wells. This is a brief step (several minutes) and the apparatus can be of any height without having a negative effect on the efficiency of the step.

The continuous crystallization process has the major disadvantages of generating a slurry of crystals, which is often difficult to transport or pump, and to require many mechanical devices (agitators, surface scrapers, centrifuges, etc.) which can create maintenance problems.

The static and dynamic crystallization processes are therefore preferred since all of the product transfers are implemented in liquid phase and the only mechanical devices employed are pumps.

In addition, dynamic crystallization has the advantage of short cycle times compared to static crystallization, which can lead to economic advantages in certain cases. In contrast, the purification factor per stage is often less favorable. In addition, certain products can not be purified using this process when their impurity content is too high.

It has also been proposed in the prior art that the static and dynamic processes be combined. In effect, the purity required of certain products necessitates purification in multiple stages. The operating yield also necessitates multiple concentration stages.

When multiple stages are necessary and when the volume to be treated is large, the use of the dynamic process can be advantageous from the investment point of view (smaller installed volume than in the case of the static process).

Nevertheless, this use of the dynamic process is sometimes only possible for purification stages in which the content of impurities is low. When the impurity content becomes too high, the form and the size of the crystals do not enable good adherence to the walls and the crystals are carried along by the circulating product.

It is for this reason that the static and dynamic processes are sometimes combined:

use of the dynamic process in the purification stages (and sometimes in the initial concentration stages) in order to reduce the installed volume, use of the static process in the final concentration stages, since the liquid is not moving which allows the crystals to stick correctly to the wall and enables solid/liquid separation.

Nevertheless, the combination of the static and dynamic processes has two major drawbacks:

In the dynamic processes, the circulation rate of the product is fixed either by gravity in the case of a falling film process such as proposed in European patent no. 616 998, or by the pump circulation rate in the case of a filled tube process. The drawback of these processes is that the circulation rate is never the rate that best corresponds to the impurity content of the product.

The necessity of switching from the dynamic process to the static process occurs when, for a stage, the circulation rate no longer allows correct adherence of the crystals to the wall. Switching over to the static process gives rise to multiple disadvantages: on the one hand, the volume of certain stages is then larger than if that stage were operating at a reduced circulation rate and, on the other hand, two different processes are implemented which increases the complexity of the installation.

SUMMARY OF THE INVENTION

The goal of the present invention is to resolve these disadvantages by providing a purification process that makes it possible to take into account the impurity content of the product and which is simple to implement. This goal is attained by means of a process for the purification of an organic product by fractionated crystallization, characterized in that the organic product is purified by circulation in filled tubes by varying the circulation rate at each purification and concentration stage.

The present invention also pertains to an apparatus for the implementation of the above-described process. This apparatus is of the type comprising at least one tube type crystallizer, constituting a tube zone through which the product current passes completely, tanks for feeding the apparatus with crude product, circulation and drainage of the intermediate and purified products, lines for the transport of the products from the tanks to the crystallizer(s) and vice versa, valves that make it possible to put the tube zones in series or to allow drainage of each tube zone, for adjusting the product circulation rate for each stage and circulation pumps equipped with a velocity variator.

Other advantages and characteristics of the invention will become manifest from the examples below which refer to the attached Figures in which.

DETAILED DESCRIPTION

Figure 1:
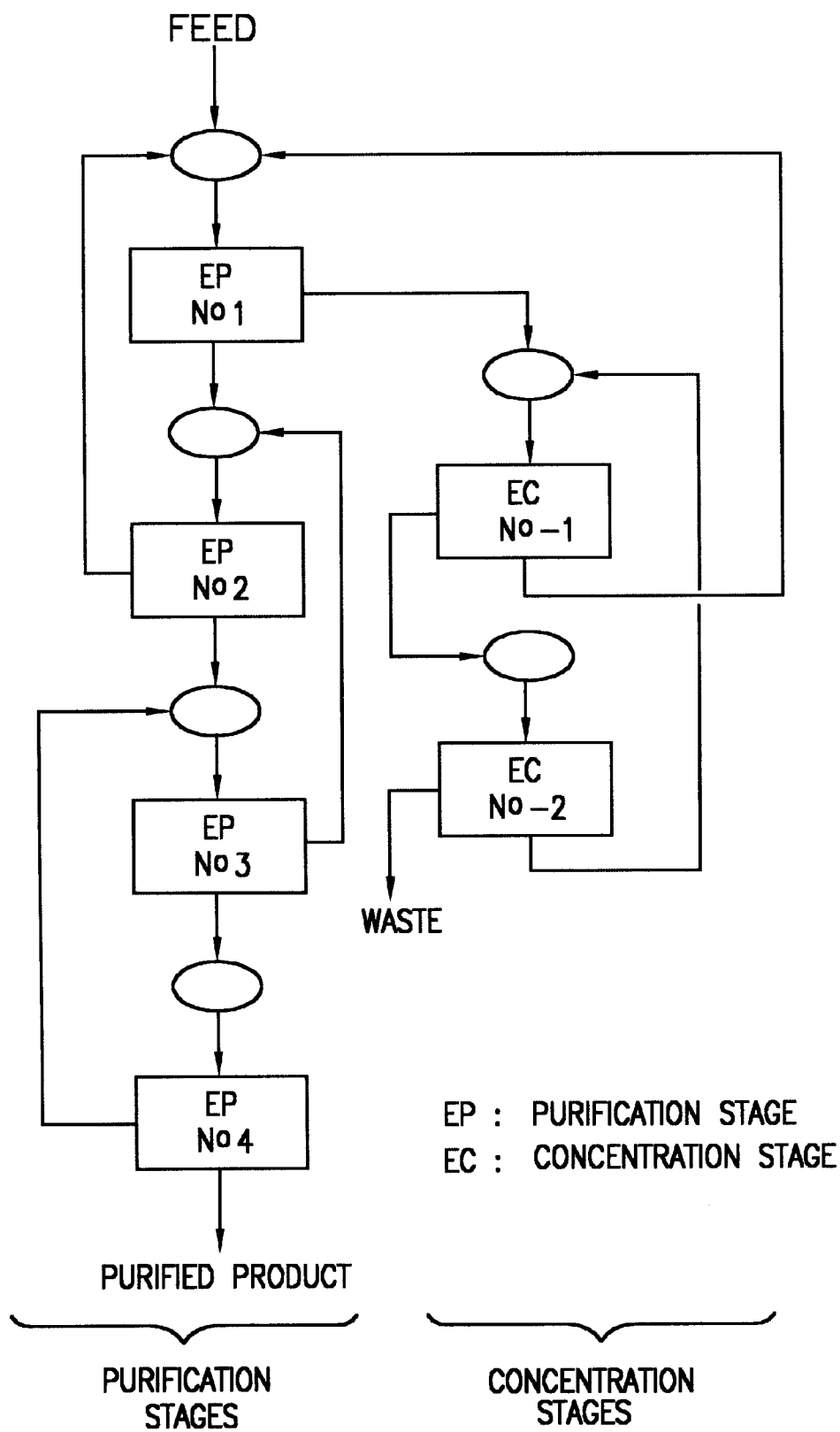
FIG. 1 is a schematic representation of the principle of a conventional multiple-stage purification process.

The process of the invention is remarkable in that it makes it possible to select the circulation rate that corresponds to the best purification factor/installed volume compromise. Thus, the circulation rate in the final purification stages is higher than the circulation rate in the final concentration stages.

It is particularly preferred to select a rapid circulation rate in the final purification stages and a slower circulation rate in the final concentration stages. The slowest circulation rate is preferably on the order of 5 to 10 times slower that the fastest rate.

A rapid circulation rate is more particularly understood to mean a velocity of the product in the tubes between approximately 0.5 and 1.2 m/s, and preferably between 0.7 and 1.0 m/s.

A very slow circulation rate is more particularly understood to mean a velocity of the product in the tubes between approximately 0.05 and 0.2 m/s, and preferably between 0.1 and 0.15 m/s.

These velocities are in functions with the nature of the product to be purified. The process of the invention can therefore be applied to all organic products, such as naphthalene, acrylic acid, benzoic acid, etc.

The process of the invention is of the type, as stated above in relation to the static process, employing an apparatus comprising one or more crystallizers equipped with heat transfer systems. The device is first filled with the material to be purified which is at that point entirely liquid. This material is then subjected to the steps of crystallization, drainage, purification of the residual liquid and melting, constituting the purification stage when they are intended to purify the product and constituting the concentration stage when they are intended to concentrate the impurities.

The research carried out by the Applicants revealed that the slower the product circulation rate for a given phase, the greater is the extent to which the crystals are distributed in a homogeneous network. It is therefore necessary to limit the height of the tubes so that drainage takes place correctly irrespective of the product circulation rate. In addition, it is important to preserve the advantage of the small footprint of a dynamic apparatus because of its tallness.

The two aspects referred to above lead to the conception of a process in which the product can circulate in all of the tubes during the crystallization phase, but in which the liquid flows through a limited height of crystals during the drainage phase.

The present invention also pertains to an apparatus for the implementation of the above-described process. This apparatus is of the type comprising at least one tube type crystallizer, constituting a tube zone through which the product current passes completely, tanks for feeding the apparatus with crude product, circulation and drainage of the intermediate and purified products, lines for the transport of the products from the tanks to the crystallizer(s) and vice versa, valves that make it possible to put the tube zones in series or to allow drainage of each tube zone, for adjusting the product circulation rate for each stage and circulation pumps equipped with a velocity variator.

In addition, as previously stated, the Applicants have conceived an apparatus in which the product can circulate in all of the tubes during the crystallization phase, but in which the liquid flows through a limited height of crystals during the drainage phase.

Figure 4:
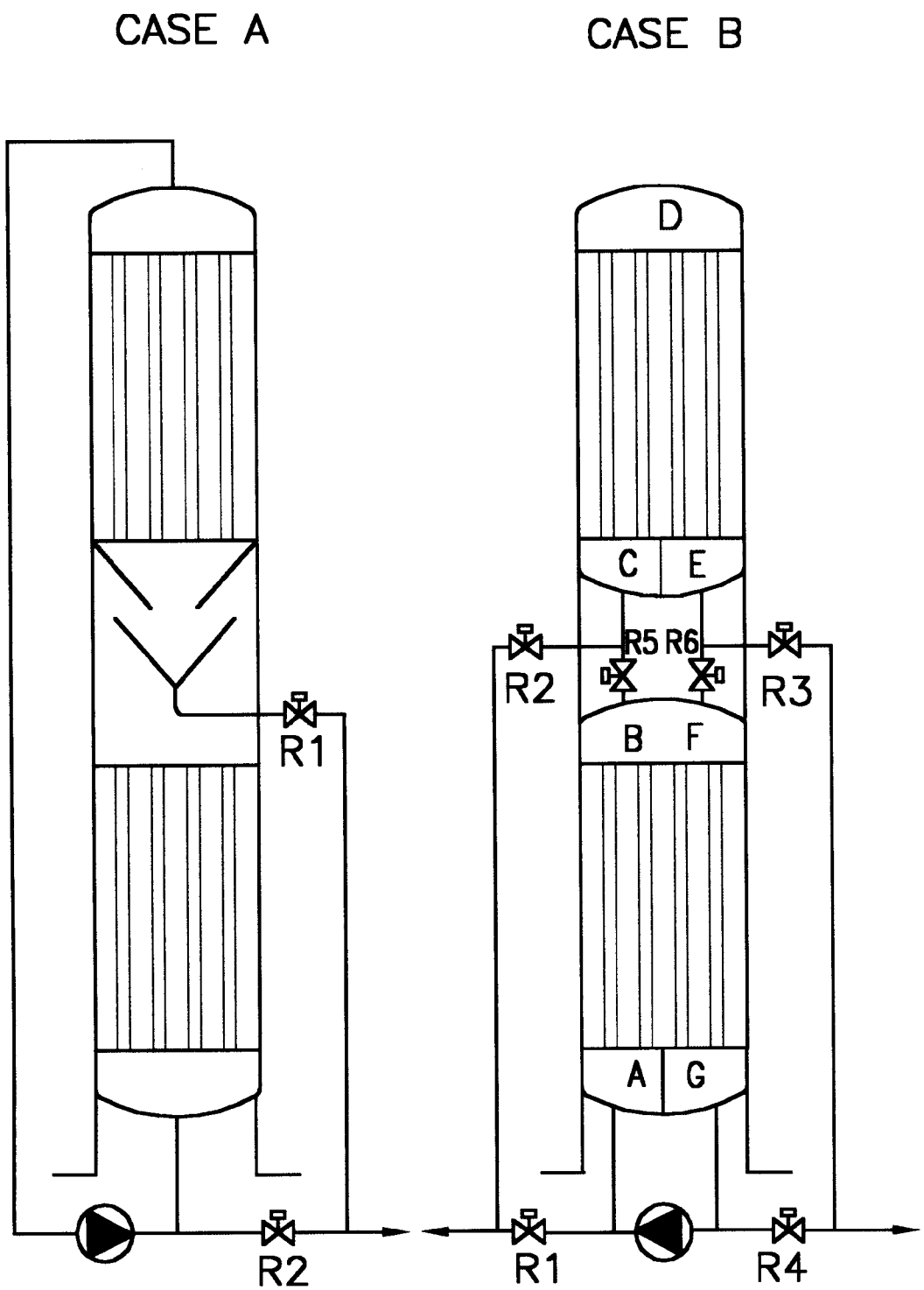
FIG. 4 is a schematic representation of two forms of implementation (CASE A, CASE B) of the process and the apparatus of the invention in which the product can circulate in all of the tubes during the crystallization phase but in which the liquid flows through a limited height of crystals during the drainage phase.

Various forms of implementation of this principle can be employed in order to put this function into practice. FIG. 4 shows two examples:

In CASE A, the apparatus comprises a sluice separating each tube zone. In the crystallization phase, the valves (R1 and R2) are closed and the product circulates from one zone to the other (operating in one pass). In the drainage phase, the valves (R1 and R2) are open so as to allow separate flow from each zone.

In CASE B, the apparatus comprises circulation and drainage compartments. A set of automatic valves makes it possible to put each tube zone in series or to enable separate drainage of each zone. Thus, during the crystallization phase, the product circulates via the intermediary of the pump in all of the compartments (A, B, C, D, E, F and G) successively (operating in two passes). The automatic feed valves (R1, R2, R3 and R4) are closed and the valves between the tube zones (R5 and R6) are open. During the drainage phase, the pump is turned off, the valves between the tube zones (R5 and R6) are closed and the product flows into only a portion of the compartments (A, C, E and G) separately.

The drainage system for each tube zone can be of various types, i.e., the compartment type or the sluice tube. FIG. 4 represents this principle by showing two tube zones but the number of zones in a given apparatus can be higher than two.

Referring back to conventional approaches, FIG. 1 is a schematic representation of the principle of a multiple-stage purification process. In this Figure, "EP" indicates the purification stages, which comprise four stages in the example of FIG. 1, and "EC" represents the concentration stages, which comprise two stages in the example of FIG. 1. FIG. 1 also shows the recyclings which are implemented when multiple stages are necessary.

Figure 2:
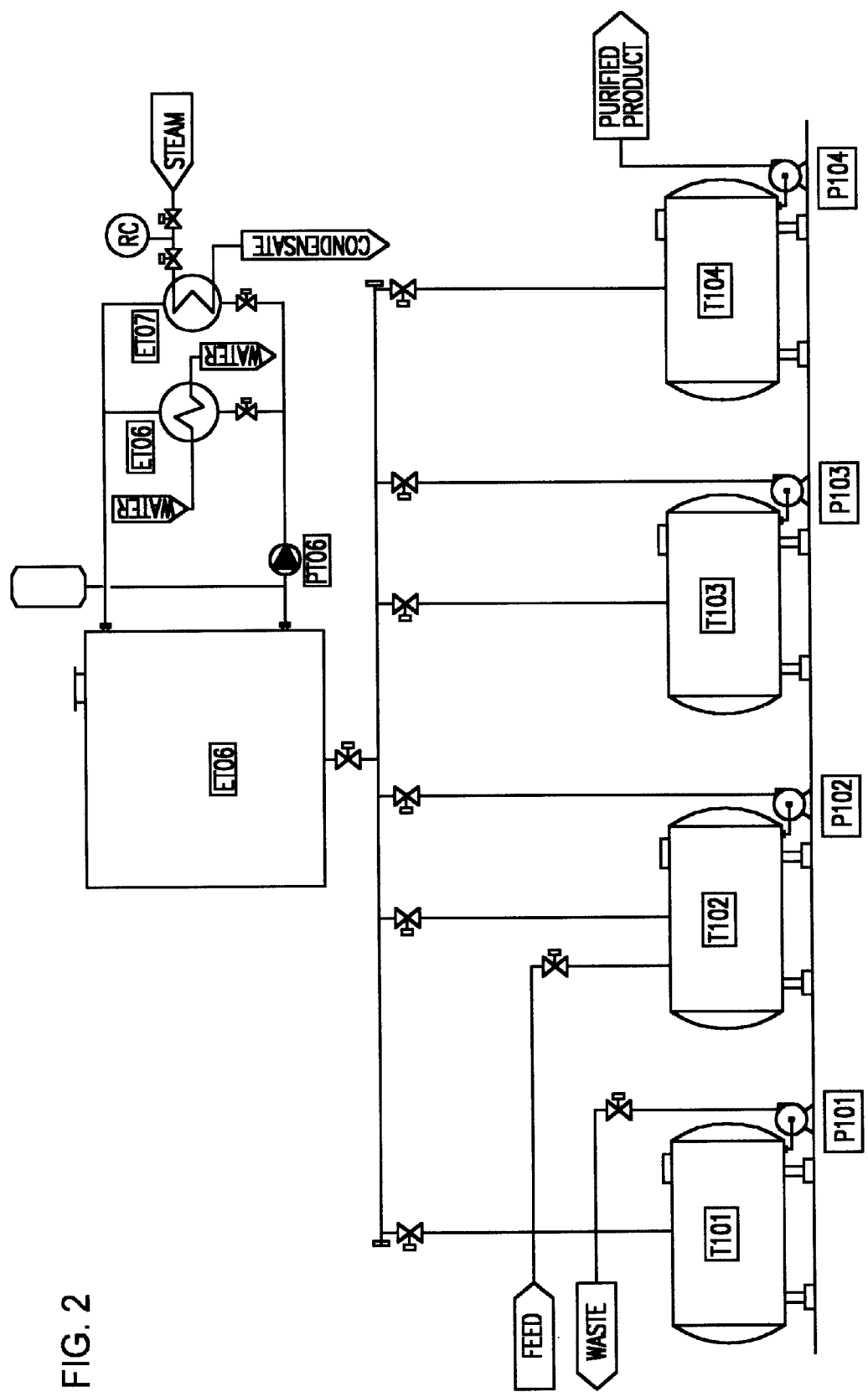
FIG. 2 is a schematic representation of the principle of a process for purification by static crystallization of the prior art.

FIG. 2 is a schematic representation of the principle of a process from the prior art for purification by static crystallization. In this Figure, one crystallizer R106 is used for implementing two purification stages. The product to be treated is stored in the tank T102. The crystallizer is fed for the first purification stage via the pump P102. The product then remains immobile in the crystallizer during the crystallization step. The waste from this stage is drained via gravity into the tank T101 and the product which had been subjected to a first purification is drained into the tank T103. From this tank, the product is sent into the crystallizer by the pump P103 for a second purification stage. The product also remains immobile in the crystallizer during the crystallization step. The waste from this stage is drained via gravity into the tank T102 and the purified product is drained into the tank T104. A thermal fluid circulates in the crystallizer via the pump P106. The heating and cooling energies are supplied by the exchangers E106 and E107.

Figure 3:
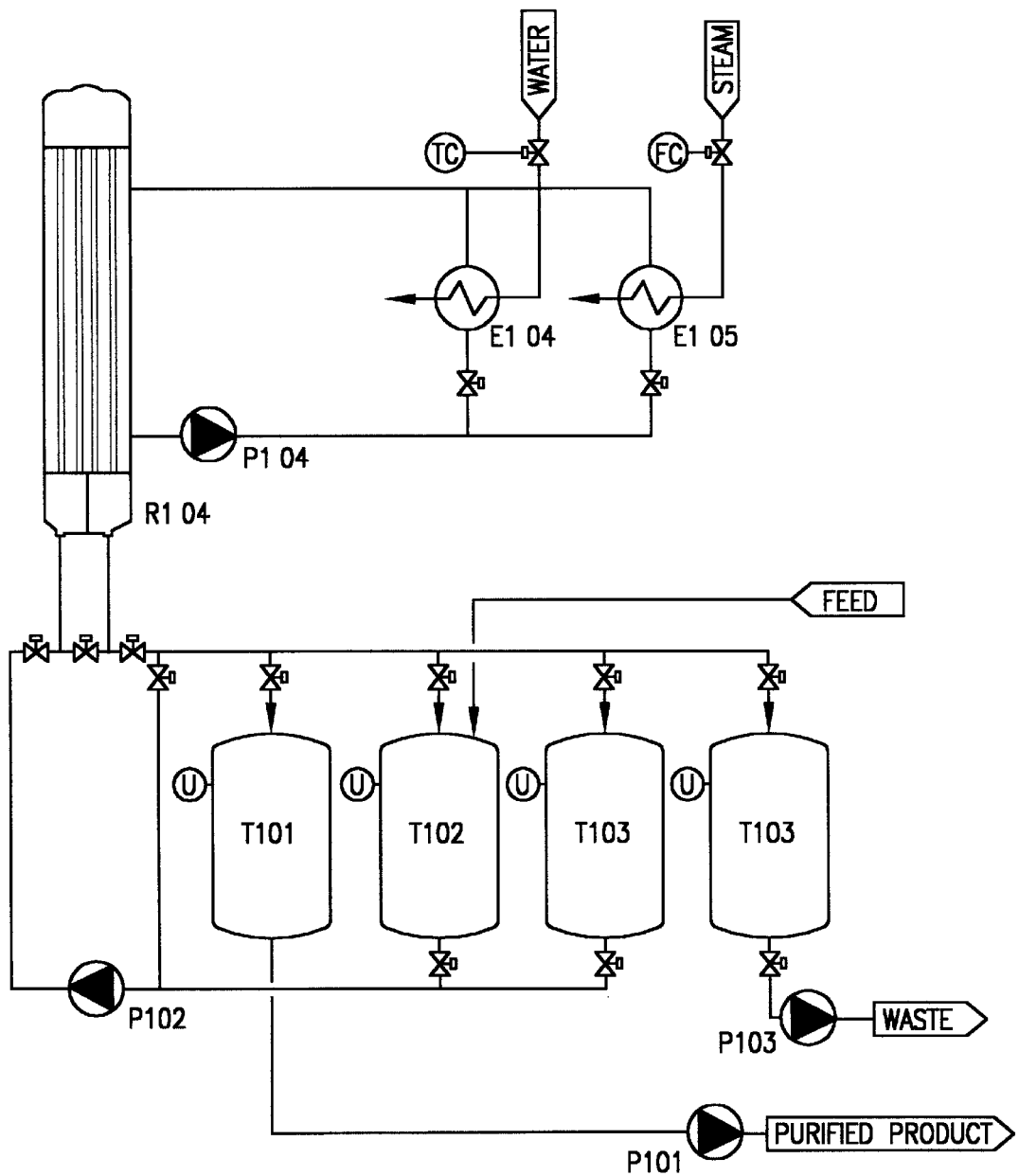
FIG. 3 is a schematic representation of the principle of a process for purification by dynamic crystallization of the prior art.

FIG. 3 is a schematic representation of the principle from the prior art of a dynamic crystallization purification process employing filled tubes. In this figure, one crystallizer (R104) is used for implementing two purification stages. The product to be treated is stored in the tank T102. The crystallizer is fed for the first purification stage via the pump P102, which is also used for circulating the product in the apparatus during the crystallization step. The waste from this stage is drained via gravity into the tank T101 and the product that was subjected to a first purification is drained into the tank T103. From this tank, the product is sent to the crystallizer by means of the same pump P102 for a second purification stage. The pump is also employed to circulate the product in the apparatus during this second crystallization step. The waste from this stage is drained via gravity into the tank T102 and the purified product is drained into the tank T104. A thermal fluid circulates in the crystallizer by means of the pump P104. The heating and cooling energies are supplied by the exchangers E104 and E105. In this process, identical rapid circulation rates are used for the two stages.

FIG. 4 is a schematic representation of two forms of implementation (CASE A, CASE B) of the process and the apparatus of the invention in which the product can circulate in all of the tubes during the crystallization phase, but in which the liquid flows through a limited height of crystals during the drainage phase.

A configuration corresponding to case A can be used when the volume of product to be treated is limited and, as a result, the diameter of the apparatus is small. In this case, the apparatus can operate in a single pass. This configuration limits the number of automatic valves employed.

A configuration corresponding to case B is used when the volume of product to be treated is large and when the diameter of the apparatus is large. In this case, in order for the circulation pump flow rate of the product to remain acceptable, it is necessary for the apparatus to undergo multiple passes. Automatic valves between the compartments as shown in FIG. 4 (R2, R3, R5, R6) are then necessary.

EXAMPLE

Purification of Naphthalene According to the Process of the Invention

The purification of naphthalene at the industrial level is generally performed in two manners:
either using the static process alone,
or using a combination of the static and dynamic processes, subject to the limitation that the dynamic process can not be used for the final concentration stages.

The process of the invention exhibits the following advantages in relation to the two processes of the prior art:

In relation to the use of the static process alone, the process of the invention has a space-saving advantage because the vertical configuration of the apparatus for its implementation makes it possible to reduce the floor space required. In addition, the circulation rate of each stage can be adjusted so as to obtain the best separation efficiency/time compromise. As a result, the apparatus volume employed is optimized.

In relation to the use of a static/dynamic combination, the process of the invention also exhibits a space-saving advantage in relation to an installation in which two types of apparatus must be installed. In addition, for reduced capacities, a single apparatus can be employed which is not the case when the two processes are combined. Finally, for the purification stages basically, the circulation rate of each stage can be adjusted so that the consumption of electricity (pumps) is reduced.

Figure 5:
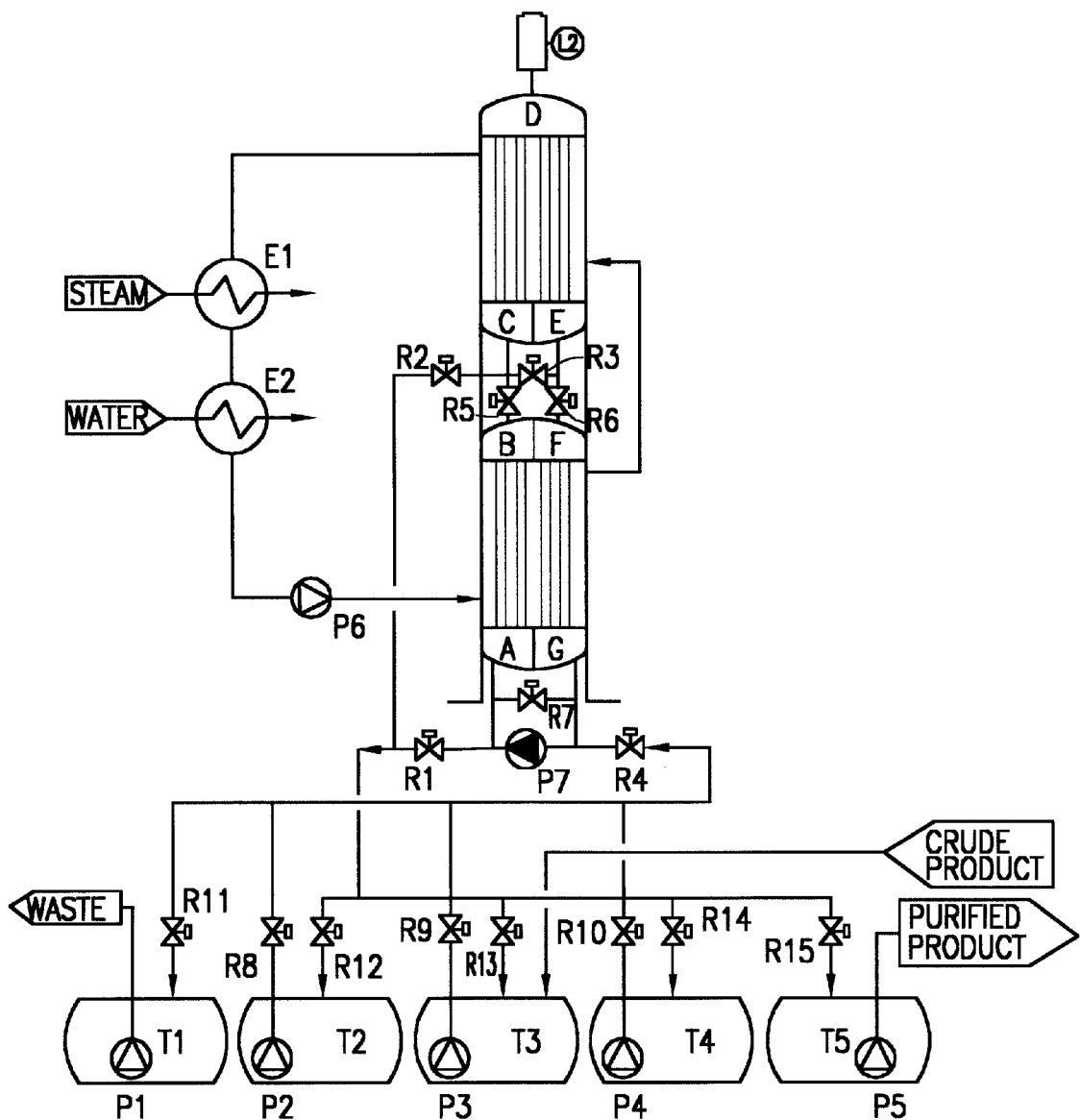
FIG. 5 is a schematic representation of one form of implementation of the process of the invention and of the associated apparatus, employed in this case for the purification of naphthalene.

As shown in FIG. 5, the purification of naphthalene according to the process of the advantage is implemented in three stages: two purification stages and one waste concentration stage.

1) Description of the first stage

The crude product to be treated arrives in the tank T3. The crystallizer is fed from this tank by the pump P3. The valves R9, R4, R7, R5, R6 are then opened. During this filling, the crystallizer is cooled by means of the heat exchanger E2.

When the crystallizer is full, the valves R4, R7 and R9 are closed, pump P7 is turned on and the product circulates in the apparatus. The pump flow rate is adjusted by a variator so as to obtain a predetermined circulation rate in the tubes. For example, a velocity of the order of 0.8 m/s is envisaged for this first stage.

Cooling is continued until the desired amount of crystals is obtained in the apparatus.

The next stage entails drainage of the liquid in which the impurities are concentrated. As described above, this drainage is implemented through limited apparatus heights. Good results are obtained for heights of 2 m to 2.5 m. This drained liquid is sent into tank T2. In order to implement this transfer, valves R1, R2, R3, R7 and R12 are opened.

After this drainage has been implemented, a liquid phase separation or partial melting of the crystals enables improvement of the purity of the mass remaining in the apparatus. Thus liquid phase separation is implemented by heating the apparatus via the exchanger E1. The flow discharged from the crystallizer is transferred into the tank T3 (closing of R12 and opening of R13).

Finally, when the purity required at the end of the stage is reached, the crystalline mass is completely melted and the product is transferred into the intermediate tank T4.

2) Description of the other stages

The principle of the other stages is identical but the temperature levels, the product circulation rates and the tanks employed are different:

For the concentration stage, the feed is from the tank T2, the drainage is into the tank T1 (final waste), the liquid phase separation into the tank T2 and the melt into the tank T3. A lower circulation rate is recommended (0.1 m/s for example).

For the final purification stage, the feed is from the tank T4, the drainage into the tank T3, the liquid phase separation into the tank T4 and the melt into the tank T5 (purified product). A high circulation rate yields good results (1 m/s).

What is claimed is:

1. A process for the purification of an organic product by fractionated crystallization comprising:

purifying the organic product by circulating the organic product in filled tubes through at least one purification stage and at least one concentration stage; and varying circulation rates, as a function of impurity level, at each of the purification and concentration stages.

2. The process according to claim 1, wherein the circulation rate in final purification stages is higher than the circulation rate in final concentration stages.

3. The process according to claim 1, wherein the circulation rate is rapid in the final purification stages and slow in the final concentration stages.

4. The process according to claim 2, wherein the circulation rate is rapid in the final purification stages and slow in the final concentration stages.

5. The process according to claim 3, wherein the slow rate is 5 to 10 times slower than the fast rate.

6. The process according to claim 4 wherein the slow rate is 5 to 10 times slower than the fast rate.

7. The process according to claim 3, wherein the rapid rate in the final purification stages is between approximately 0.5 and 1.2 m/s, and in the slow rate in the final concentration stages is between approximately 0.05 and 0.2 ms.

8. The process according to claim 3, wherein the rapid rate in the final purification stages is between approximately 0.7 and 1.0 m/s, and in the slow rate in the final concentration stages is between approximately 0.1 and 0.15 ms.

9. The process according to claim 5, wherein the rapid rate in the final purification stages is between approximately 0.7 and 1.0 m/s, and in the slow rate in the final concentration stages is between approximately 0.1 and 0.15 ms.

10. The process according to claim 1, wherein the organic product circulates in all of the tubes during crystallization, but flows through a limited height of crystals in the filled tubes during a drainage phase.

11. Apparatus for fractionated crystallization of an organic product comprising:

at least one tube crystallizer forming tube zones through which the organic product passes completely;

at least one tank for feeding crude product to the crystallizer;

at least one tank for circulation and drainage of intermediate and purified products;

lines connected between the tanks and the crystallizer(s) for transporting the products therebetween;

valves associated with the lines which place the tube zones in series or to allow drainage of each tube zone, and to adjust product circulation rate for each stage; and at least one variable velocity circulation pump connected to control circulation rates in the tubes(s) as a function of impurity level.

12. The apparatus according to claim 11, further comprising circulation and drainage compartments and automatic valves to put each tube zone in series or to enable drainage of each of the tube zones separately.

13. The apparatus according to claim 11, further comprising a sluice separating each tube zone and valves enabling separate flow from each tube zone.

14. The apparatus according to claim 11, comprising multiple tube zones and wherein identical or different drainage systems of each zone are selected from:

drainage compartments and automatic valves to put each tube zone in series or to enable drainage of each of the zones separately; and a sluice separating each tube zone and valves enabling separate flow from each tube zone.

\* \* \* \* \*